Nov. 1, 1932.  E. H. LORENZ  1,885,740
PARISON TRANSFER MECHANISM
Filed Oct. 29, 1931  4 Sheets-Sheet 1

Witness:
A. A. Horn

Inventor
Edward H. Lorenz
by Brown & Parham
Attorneys.

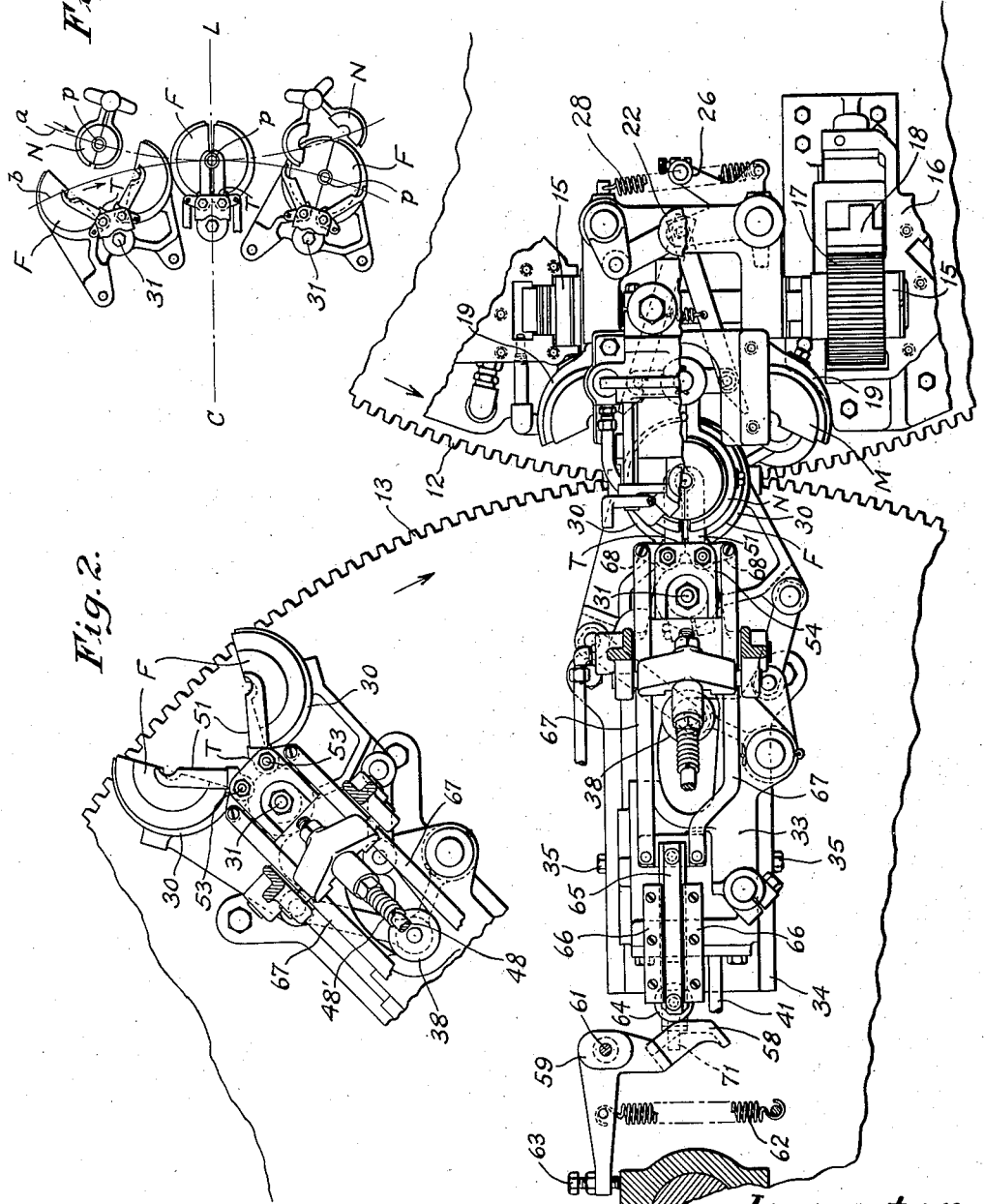

Nov. 1, 1932.  E. H. LORENZ  1,885,740

PARISON TRANSFER MECHANISM

Filed Oct. 29, 1931  4 Sheets-Sheet 3

Witness:
A. A. Horn

Inventor
Edward H. Lorenz
by Brown & Parham
Attorneys.

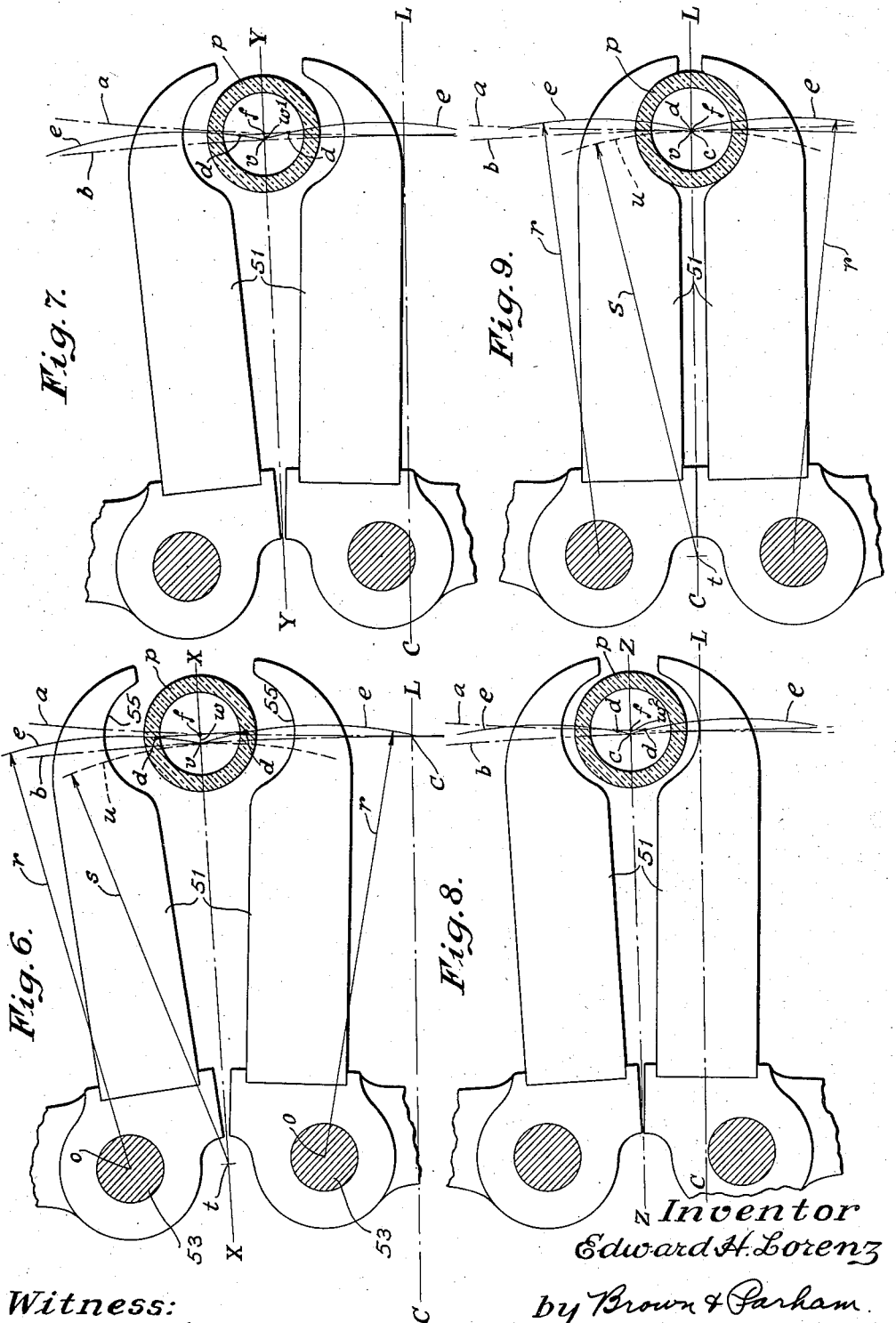

Patented Nov. 1, 1932

1,885,740

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

PARISON TRANSFER MECHANISM

Application filed October 29, 1931. Serial No. 571,788.

This invention relates to parison-transfer mechanisms for glassware forming machines, and has particular relation to automatic devices for transferring a parison from a parison forming unit on one continuously rotating table, to a companion blow mold on an adjacent continuously rotating table.

It is very desirable to continuously rotate the mold tables of a glassware forming machine in order to increase the speed of production and for other reasons. However, it is difficult to effect the transfer of a parison between continuously moving molds in an efficient manner without injuring the parison which at the time of transfer is in a plastic or semi-plastic condition.

Various arrangements already have been proposed for accomplishing such a transfer, as for example that disclosed in the co-pending application Ser. No. 492,407, filed October 31, 1930, jointly by myself and George E. Rowe, in which the finishing mold is moved bodily relative to its table and about the axis of the parison mold table as it is closed about a parison suspended from the neck mold of the parison forming unit. Moreover, the use of tongs which are mounted on the blow mold table and which are moved bodily relatively to the table in receiving a parison, has been suggested in the co-pending application of Robert Canfield, Ser. No. 351,426, filed March 30, 1929.

Such bodily movement of the finishing mold or tongs, as the case may be, and which may be called a "following" movement, causes travel thereof while in axial alignment with, or in the path of, the parison supported by the neck mold or some other part of the parison forming unit, and affords ample time for the parison receiving means to close about the parison without injury thereto. However, this requires the provision of mechanisms for effecting such movement of the finishing molds or tongs, increasing the cost of initial construction and maintenance of the machine, and making the arrangement of the operating parts on the blow mold table undesirably complicated.

It is the general object of the present invention to provide novel transfer means of the above character on the blow mold table, which may comprise tongs, the members of which, in closing about a parison in a parison forming unit, are caused to move inwardly of the blow mold table and in effect to have a "following" movement with respect to the parison, without being moved bodily relative to the blow mold table. This eliminates the mechanisms heretofore necessary to effect bodily movement of transfer means, and greatly simplifies the construction and arrangement of parts on the blow mold table. Furthermore, the ends of the tongs recesses may be rounded to prevent the tongs from "digging" into the parison. In this respect the use of tongs to remove the parison from the neck mold gives an advantage over the use of a finishing mold for the same purpose, because the ends of the parison-gripping recesses of the finishing mold are sharp and are apt to "dig" into the parison, and rounding them would spoil the neck of the finished article.

More specifically, it is an object of the present invention to provide transfer tongs bodily stationary on a continuously rotating blow mold table, the members of which are mounted on horizontally spaced pivots so that when the tongs are closed about a parison in a continuously rotating parison forming unit, the tongs members can move inwardly of the blow mold table and in effect "follow" the path of movement of the parison.

The tongs may permanently be fixed on the blow mold table during a transfer operation so as to be rotated continuously thereby, and held in such a position as to close above the associated finishing or blow mold and about the axis thereof. A parison supporting means such as a neck mold may form a part of the parison forming unit and operate to carry a parison suspended therefrom into a transfer zone and toward the line of centers of the mold tables along a circular path having the center of the parison mold table as its axis, this resulting from the continuous rotation of the parison mold table. Mechanism for closing the tongs may be provided, the operation of which is timed to swing the tongs members about their spaced pivots inwardly of the blow mold table as the parison approaches the line of centers of the tables where the members may finally be closed about the parison and the parison quickly released from the neck mold. This leaves the parison in a position to be enclosed by the finishing mold without the necessity of effecting relative movement between the tongs and the finishing mold to permit the latter to close.

The resulting movement of the tongs caused by rotation of the finishing mold table and the simultaneous swinging of the tongs about their spaced pivots inwardly of the finishing mold table is such that the tongs travel with the parison for a sufficient distance as they are closing to permit them to close gradually without risk of injury to the parison. Thus a smooth and efficient transfer is accomplished without the necessity of providing mechanism for bodily moving the tongs relative to the blow mold table.

Other objects of the invention will be pointed out in the detailed description thereof, which follows, or will become apparent therefrom.

In order that the invention may more readily be understood and its various advantages appreciated, reference should be had to the accompanying drawings, in which:

Fig. 2 is a view in top plan of the construction shown in Fig. 1;

Figs. 5, 6, 7, 8 and 9 are diagrammatic views illustrating the operation of the transfer mechanism of this invention.

The manner in which the transfer mechanism of the invention may be employed is illustrated herein by the embodiment of the invention in a continuous two-table glassware-forming machine, such as is disclosed in the copending application Ser. No. 492,407 above referred to. Only such parts of such machine are illustrated and described as are deemed necessary for an understanding of the mode of operation of the transfer mechanism.

Figure 1:
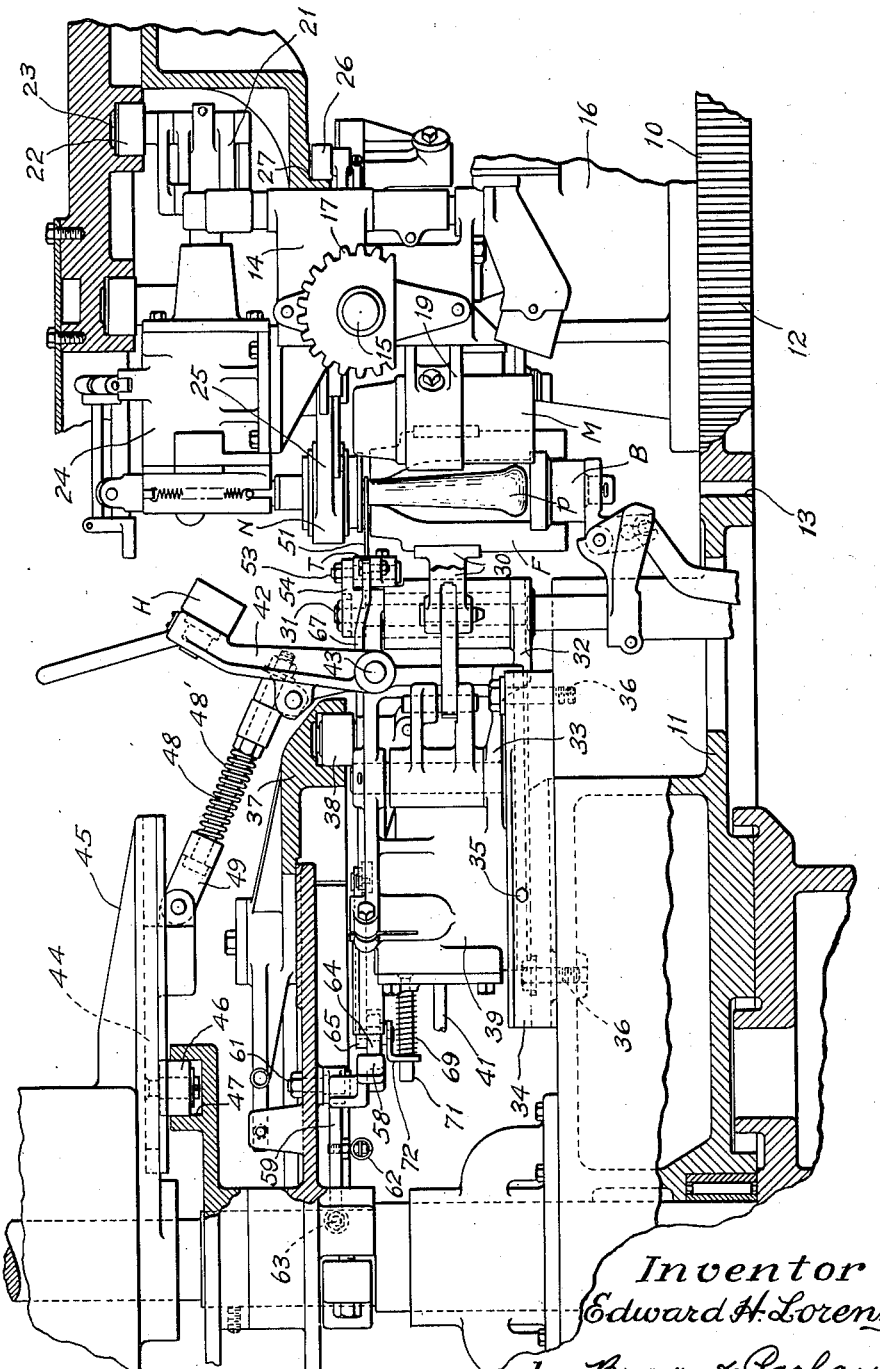
Figure 1 is a view in vertical sectional elevation of a portion of a glassware forming machine embodying the invention.
Figure 4:
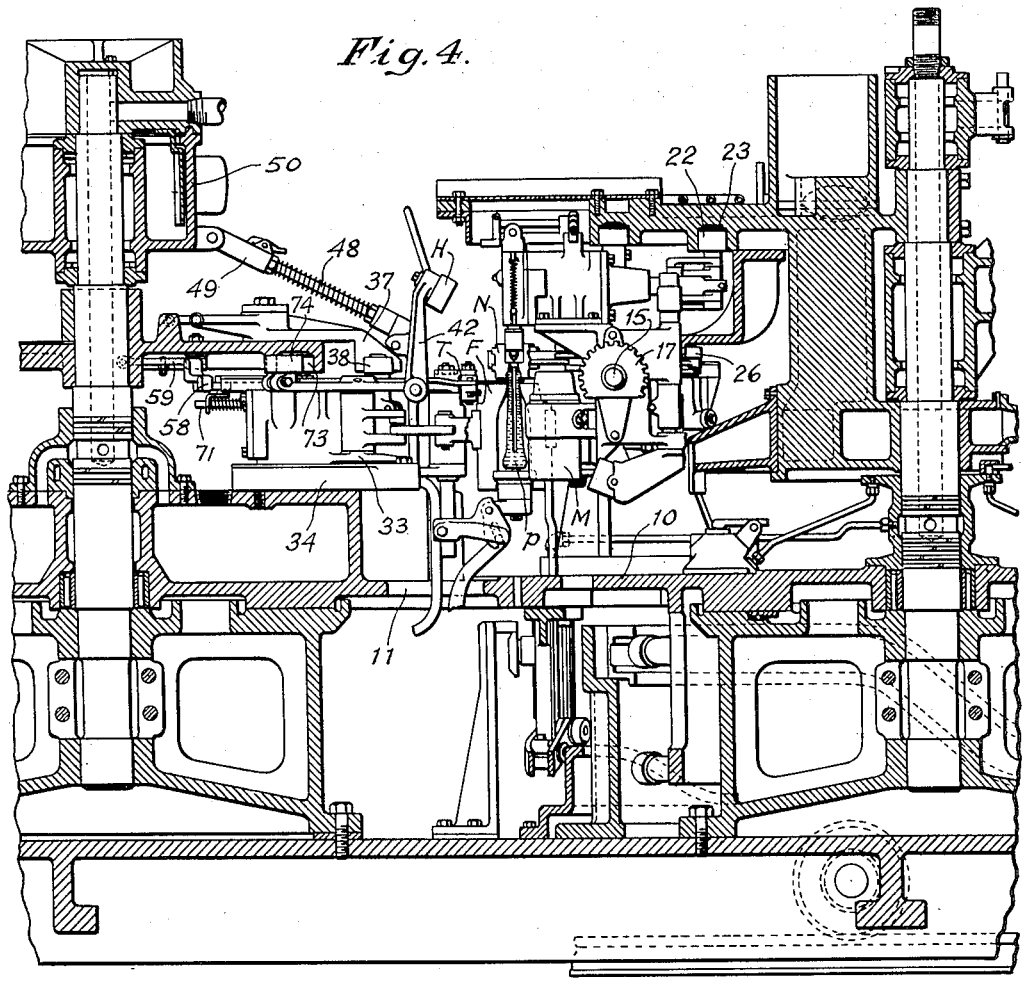
Fig. 4 is a view on reduced scale in vertical sectional elevation showing a modification of the construction shown in Figs. 1 and 2.

As shown in Figs. 1, 2 and 4, the machine comprises a parison forming unit including a neck mold N, a parison body mold M, and a finishing mold unit comprising finishing mold F, blow head H and a bottom plate B for the finishing mold. Transfer tongs indicated at T are associated with the finishing mold for transferring a parison from the neck mold to the finishing mold, as hereinafter explained.

The parison forming unit is carried by a table 10 and the finish mold unit is carried by a table 11, and these tables may be provided on their peripheries with gears 12 and 13 respectively, so that they may be driven continuously in synchronism with each other. Suitable means (not shown) may be engaged with the gear on one of the tables for driving the machine.

The neck mold N and body mold M of the parison forming unit may be suitably mounted in a casting 14 pivoted by means of trunnions 15 in pedestals 16 on the table 10. One of the trunnions may carry a pinion 17 engaged by rack 18 operated in suitable manner at appropriate times to invert the parison forming unit for the reception of a charge of glass, and afterwards to revert the unit into the position shown in Figs. 1, 2 and 4.

The parison body mold M may be composed of sections as shown, mounted in holders 19 which are operated to open and close the mold by linkage designated generally at 21, and including a cam roller 22 engaging cam 23 for controlling such opening and closing of the mold. In order to assist in operating the mold, an air motor indicated at 24 may be connected to the linkage 21 and operated in the manner disclosed in the above-referred-to application, Ser. No. 492,407.

The neck mold N likewise is of the sectional type, the sections being carried by holders 25 having connections with a roller 26 which engages a cam 27 to open the neck mold at the desired time. The neck mold may be closed by a spring indicated at 28, Fig. 2.

The finishing mold F likewise comprises separable sections which are carried in holders 30 pivoted at 31 on a stud which is mounted in lugs 32 projecting from the casting 33. The casting 33 is secured in a plate 34 by bolts 35, said plate in turn being fastened to the table 11 by screw bolts 36.

The finishing mold is closed by a cam 37 engaged by a cam roller 38 which is connected to suitable linkage in turn joined to the blow mold holders 30, as shown in Fig. 2. The closing of the finishing mold is assisted by the admission of air to air motor 39 contained within or forming a part of the casting 33, and to which air may be admitted through a conduit 41. This may serve to hold the finishing mold closed against the pressure of finish blowing air when roller 38 has been disengaged from cam 37.

Suitable cam means (not shown) may be provided for opening the finishing mold for the removal of finished glassware, in a known manner.

The blowhead H is carried by an arm 42 pivoted at 43 to the blow mold casting 33. The blow head is moved into and out of engagement with the finishing or blow mold by the reciprocation of a slide 44 mounted in guideway 45 secured to the column of the blow mold table. The slide 44 carries roller 46 which rides in cam 47 and is connected to the arm 42 by a rod 48. The rod 48 passes loosely through a clevice 49 pivoted to the slide and is surrounded by a compression spring 48' which yieldingly holds the blow head in engagement with the finishing mold when the blow head is moved to operative position.

Considering now the tongs mechanism T with which the invention is particularly concerned, it will be seen that the mechanism comprises members 51 (Figs. 1, 2 and 3) secured to hubs 52 on spindles 53, these spindles being mounted in a projection 54 of the casting 33. The spindles 53 are spaced laterally of a radial line between them the desired distance, so that the tongs will operate in the manner described hereinafter.

Figure 3:
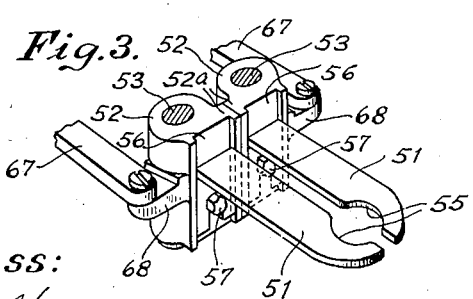
Fig. 3 is an enlarged view in perspective of the tongs embodied in the invention.

As shown in Fig. 3, the members 51 are recessed at 55 so that they may be closed about a circular parison. Also said members are held in spaced relation when closed by the stop portions 52–a of hubs 52, and each of them is mounted in a vertical slot 56, being secured therein for vertical adjustment by a nut 57. Preferably the ends of the recesses 55 in the members 51 are rounded, as shown, to prevent injury to the parisons. The stop portions 52–a on hubs 52 prevent the members 51 from gripping a parison too tightly and may in fact prevent such gripping altogether, the members only being permitted to loosely embrace a parison, the neck of which will serve to hold it in the tongs. The tongs are so supported that the opening between them is in axial alignment with the finishing mold, when both are closed.

The tongs are opened and closed in response to the rotation of the blow mold carrier, and to this end a stationary cam 58 is provided, which cam is carried by a bell crank 59 mounted on pivot 61. The bell crank is yieldingly held in fixed position by a spring 62. This arrangement prevents injury to the mechanism if glass is jammed between the members 51, in which event the spring 62 will give and no further closing movement of the members will ensue.

The position of the bell crank and hence of the cam 58 may be adjusted by screw 63 to insure that the tongs will close at the desired time.

Cam 58 is engaged by a cam roller 64 on slide 65 mounted between guides 66 on the top of the casting 33 and the slide in turn being connected to a yoke, the outer ends of the side members 67 of which are pivotally connected to lugs 68 on the hubs 52, which carry the tongs members. When the roller 64 moves into engagement with cam 58, the tongs are closed at a rate determined by the contour of the cam, and when said roller moves out of engagement with the cam, the tongs are opened by a compression spring 69 on pin 71 projecting rearwardly from the casting 33 and engaging a depending lug 72 on the slide 65.

The modified construction shown in Fig. 4 is substantially the same as the preferred embodiment shown in Figs. 1 and 2, except that the casting 33 which carries the finishing mold F is free to slide in a guideway provided in the plate 34. Sliding movement of the casting 33 and the parts carried thereby is effected by means of a cam 73 which is engaged by a cam roller 74 carried on the top of the casting 33 as shown. The cam 73 may be so shaped as to move the finish mold outwardly of its table for the removal of finish glassware at the delivery station and to hold the mold in such outer position against movement relative to the table for rotation about the axis of the finishing mold table during and shortly after the transfer operation. After the transfer operation the finishing mold may again be moved to an innermost position by the cam 73.

Such movements of the finishing mold may be utilized to move the blow head H into and out of engagement with the finishing mold and to this end the clevice 49 of the blow head operating mechanism may be connected to an annular member 50 which rotates with the mold table. Thus the clevice is held against movement, as a result of which, movement of the casting 33 relative to the table and of the arm 42 which carries the blow head causes the blow head to be lowered into operative position when the casting and finishing mold are moved inwardly of the mold table after the transfer operation, and in a like manner the blow head is raised, when the mold is moved outwardly of its table as previously described.

It will be understood that the tongs mechanism carried by the slidable finishing mold may be identical with that disclosed in Figs. 1 and 2.

The above-described apparatus may operate as follows:

The parison body mold is opened leaving a parison $p$ suspended from the neck mold N, as shown in Figs. 1 and 4. The neck mold and parison move into the transfer zone with the companion finishing mold F and tongs T, they being open as shown in Fig. 5. The path of the parison is indicated by line $a$ and that of the finishing mold by line $b$.

The directions of movement of the molds and tongs are indicated by the arrows in Figs. 2 and 5.

As the molds approach the line of centers in the transfer zone, the finishing mold F begins to close under the control of cam 37 and is nearly closed on the line of centers C—L of the mold tables. At this position, the tongs T may be completely closed, having been so operated by the engagement of roller 64 with cam 58, and the neck mold may quickly be opened by cam 26, releasing the parison to the tongs.

As the finishing mold F and tongs T move away from the line C—L, the finishing mold may be completely closed and the tongs opened by the disengagement of roller 64 and cam 58, releasing the parison in the finishing mold and completing the transfer operation.

The closing operation of tongs T is illustrated in greater detail in Figs. 6 to 9 inclusive. In these figures, the center line of the mold tables and the mold paths are indicated as in Fig 5, at C—L, a and b respectively. The lines a and b are tangent at c on line C—L.

The tongs are shown in angular positions approaching line C—L more and more closely. Such positions are designated by radial lines X—X, Y—Y, and Z—Z, which bisect the angles between the members.

The members 51 are being closed in such a way that the centers d of recesses 55 therein describe arcs e, the radius of each of which centers is indicated at r. These arcs indicate that the members 51 and their recesses 55 are being swung inwardly of the finishing mold table in the positions of Figs. 6 to 9, as the path a of the parison approaches path b.

It further appears in each figure that the line d—d passes through point f, the center of parison p, and is itself bisected by such point. As the tongs close, line d—d becomes shorter and shorter, and finally disappears in the Fig. 9 position where the centers d coincide with point f and point c, and the tongs are completely closed.

The manner in which the tongs "follow" the path a of the center of the parison is further illustrated by lines w, w—1, and w—2. These lines connect the point f, the center of parison p, with the point v where arcs e intersect. The lines w, w—1 and w—2 become shorter and shorter as the tongs move through the angular positions X—X, Y—Y, and Z—Z until point v coincides with point f on line C—L (Fig. 9).

If the tongs should be pivoted for closing about a single pivot point t, Figs. 6 and 9, line u, the arc of the center of the recesses described by radius s, would intersect point f, the center of parison p, at the line C—L (Fig. 9), but would be spaced from point f at distances equal to lines w, w—1 and w—2 (Figs. 6 to 8). This necessarily is the case because the tongs then would swing outwardly of the finishing mold table during the entire closing movement without "following" the parison p, instead of swinging inwardly to "follow" the parison, as explained with reference to the members 51. Therefore, the positions of the recesses in the tongs members would not conform to the positions of parison p at any time—except when the tongs were completely closed. The tongs would have to be closed instantly from a relatively wide open position, at line C—L, with the risk of injuring the parison.

It will be apparent that the arrangement of the members 51 of the tongs on spaced pivots permits them to be closed relatively slowly, so that they may be closed almost completely just prior to their arrival on the line C—L. As a result, a smooth and efficient transfer operation may be effected by the tongs without moving them bodily relative to the finishing mold table and without necessarily moving either the neck mold or the finishing mold on their tables, during the transfer operation.

It will be understood that various changes may be made in the details of construction and the mode of operation of the apparatus embodying the invention without departing from the spirit and scope of the appended claims.

Having thus described my invention, what I desire to claim and secure by Letters Patent is:

1. A glassware forming machine comprising a parison mold table, a parison forming unit thereon, said parison forming unit including parison supporting means, a finishing mold table, a finishing mold thereon, means for continuously rotating said tables about eccentric vertical axes so that the parison forming unit and the finishing mold arrive simultaneously on the line of centers of said tables in a transfer zone, means for holding the parison holding means and the finishing mold against bodily movement relative to their tables in the transfer zone. whereby they are moved in paths concentric with the axes of the respective tables in said zone, and means for transferring a parison from the parison forming unit to the finishing mold, comprising a pair of recessed tongs mounted on the finishing mold table and carried thereby with the center of their recesses in alignment with the axial center line of the finishing mold cavity across the line of centers of the mold tables, said tongs comprising a pair of members, laterally spaced pivots for said members, means for closing said tongs about a parison supported by the parison supporting means near the line of centers of the mold tables, and means for holding said tongs against bodily movement relative to the finishing mold table while they are being closed.

2. A glassware forming machine comprising a parison mold table, a parison forming unit thereon, a finishing mold table, a finishing mold thereon, means for continuously rotating said tables about eccentric vertical axes so that the parison forming unit and a parison therein and the finishing mold arrive simultaneously on the line of centers of said tables in a transfer zone, a pair of recessed tongs on the finishing mold table, means for at least partially exposing the parison in the parison forming unit as said unit moves toward said line of centers, means for closing the tongs about the parison substantially on said line of centers, means for closing the finishing mold about the parison when supported by said tongs, means for opening the tongs to release the parison in the finishing mold, and means for supporting said tongs with the center of the recesses thereof in alignment with the axial center line of the finishing mold cavity during the closing and opening movements of said tongs.

3. A glassware forming machine comprising a parison mold table, a parison forming unit including a parison mold and neck mold mounted on said table, a finishing mold table having a finishing mold mounted thereon, recessed transfer tongs on the finishing mold table, means for continuously rotating said tables so that the parison forming unit and a parison therein and the finishing mold and tongs arrive on the line of centers of the tables substantially simultaneously, means for opening the parison mold to leave the parison suspended from the neck mold as the neck mold arrives on the line of centers of the machine, laterally spaced pivots for the members of said tongs, means for closing the tongs about the suspended parison substantially on said line of centers, means for opening the neck ring to leave the parison suspended from the tongs, means for then closing the finishing mold about the parison, means for opening the tongs to release the parison in the finishing mold, and means for supporting the pivots of the tongs and the finishing mold in relatively fixed positions during the closing and opening movements of said tongs.

Signed at Hartford, Connecticut, this 27th day of October, 1931.

EDWARD H. LORENZ.